UNITED STATES PATENT OFFICE.

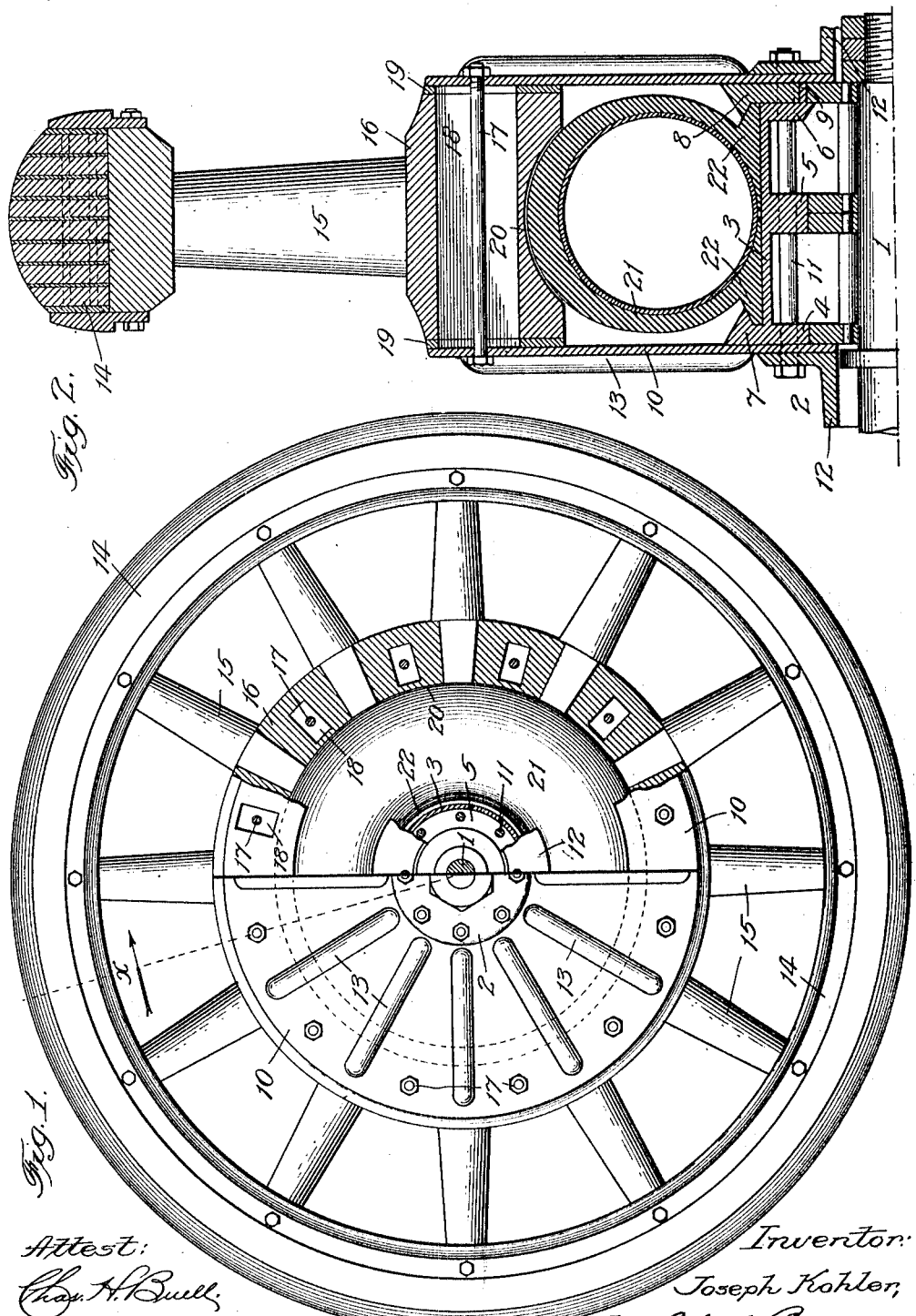

JOSEPH KOHLER, OF CHICAGO, ILLINOIS, ASSIGNOR OF ONE-HALF TO KITTIE COLLINS, OF CHICAGO, ILLINOIS.

ELASTIC WHEEL.

1,118,359.  Specification of Letters Patent.  Patented Nov. 24, 1914.

Application filed August 28, 1911. Serial No. 646,499.

*To all whom it may concern:*

Be it known that I, JOSEPH KOHLER, a citizen of the United States of America, and a resident of Chicago, in the county of Cook, State of Illinois, have invented certain new and useful Improvements in Elastic Wheels, of which the following is a specification.

This invention relates to that class of elastic vehicle wheels in which the rim is connected to the hub by an intermediate pneumatic connection to provide the required resiliency in the wheel. And the present improvement has for its object to provide a simple and efficient structural formation and combination of the connecting parts between the tread and the hub of the wheel, adapted to afford a substantial connection when the parts are in assembled relation, and which is capable of ready disassembly in making repairs, replacements and the like, all as will hereinafter more fully appear.

In the accompanying drawings: Figure 1, is a side elevation of a wheel embodying the present invention, part of the hub accessories being broken away and shown in section to more clearly illustrate the detail of construction. Fig. 2, is an enlarged detail transverse section on line $x$—$x$, Fig. 1.

Similar reference numerals indicate like parts in both views.

Referring to the drawings, 1 represents a portion of the axle upon which the hub of the present construction is mounted in any usual manner, to rotate independently of said axle, or with the same, in accordance with the use of the wheel as a steering or a driving wheel. In the present improvement said hub 2 has a cylindrical rim portion 3 provided with a series of marginal and central inturned flanges 4, 5 and 6, and with a single outwardly extending flange 7 at one end, and which in turn is formed with an inner marginal V shaped rim adapted to engage and hold one of the correspondingly formed annular attaching flanges of the elastic intermediate member, hereinafter described.

8 is an annular disk, a counterpart of the above described flange 7, and arranged at the opposite end of the hub in opposed relation to said flange 7, as shown. The disk 8 is also formed with an inner marginal V shaped rim adapted to engage and hold another of the annular attaching flanges of the elastic intermediate member above referred to, and said disk is supported in proper axial position by means of an annular neck 9 at the end of the aforesaid rim portion 3 of the hub as shown in Fig. 2.

10 are substantially counterpart side plates secured by bolts 11, and exterior reinforcing angle rings 12 to the hub 2, to form the side inclosures of an annular space surrounding the rim portion 3 of the hub, and which space is adapted to contain the annular tubular connection heretofore referred to, and also form a guide for the rim portion of the wheel. With a view to attain greater lateral stiffness the side plates 10 will be formed with a series of radial corrugations 13, as shown.

14 is the tire or tread portion of the wheel, of any usual and suitable construction, and which is connected by a series of radial spokes 15, with an inner annular rim or member 16, arranged between the side plates 10 aforesaid, and adapted to have a limited independent movement between said plates 10 in actual use. The extent of said independent movement is restricted by lateral bolts 17 carried by the side plates 10, and coacting with enlarged orifices 18 in the annular member 16, and with the size of said orifices regulating the amount of independent movement. The inner annular member 16, aforesaid will ordinarily be formed of wood and be provided with metal wear plates 19 at its respective bearing sides, as shown in Fig. 2, and in addition said member 16 will be formed with a central curved and annular cavity 20, in its inner surface or wall to provide a bearing for the crown of the annular elastic member now to be described.

21 is the ring shaped elastic intermediate member heretofore referred to, and which is formed of rubber or other like material in the manner usual to pneumatic tires. The curved crown of the periphery of said member 21 has bearing in the curved central cavity 20 of the inner rim member 16, while the inner portion of said member is formed with annular lateral flanges 22, adapted to fit the annular holding recesses of the flange 6 and annular disk 8, heretofore described, so as to provide a strong and substantial connection of the member 21 in place upon the wheel hub.

Having thus fully described my said in- vention, what I claim as new and desire to secure by Letters Patent, is:

In a resilient wheel, the combination of a tread member, an intermediate annular elastic member, a hub member, a pair of plate members disposed at opposite sides of the wheel and connected to the tread member and to the hub in a manner which permits restricted independent movement of the tread member, said hub member comprising in part a cylindrical sleeve portion forming a bearing for the inner surface of the annular elastic member, annular flanges at the respective ends of said sleeve portion, one of said annular flanges being removable and both of said flanges having opposed V-shaped marginal ribs adapted for holding engagement with correspondingly formed annular recesses in the sides of the annular elastic member, and a series of attaching bolts extending through the aforesaid pair of plate members, annular flanges and through the interior of said sleeve portion, substantially as set forth.

Signed at Chicago, Illinois, this 25th day of August 1911.

JOSEPH KOHLER.

Witnesses:
 ROBERT BURNS,
 HENRY MOE.

Copies of this patent may be obtained for five cents each, by addressing the "Commissioner of Patents, Washington, D. C."